(12) United States Patent
Hirunuma et al.

(10) Patent No.: US 6,771,434 B2
(45) Date of Patent: Aug. 3, 2004

(54) OPTICAL DEVICE

(75) Inventors: Ken Hirunuma, Tokyo (JP); Gouji Funatsu, Saitama (JP); Atsumi Kaneko, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/400,474

(22) Filed: Mar. 28, 2003

(65) Prior Publication Data

US 2003/0184879 A1 Oct. 2, 2003

(30) Foreign Application Priority Data

Apr. 2, 2002 (JP) ..................................... P2002-100045

(51) Int. Cl.$^7$ .......................... G02B 15/14; G02B 23/08
(52) U.S. Cl. ...................... 359/694; 359/823; 359/410; 359/404; 359/418
(58) Field of Search ................................ 359/694, 696, 359/697, 823, 698, 824, 410, 417, 418, 404, 403

(56) References Cited

U.S. PATENT DOCUMENTS

| | | | |
|---|---|---|---|
| 4,067,027 A | 1/1978 | Yamazaki | 396/432 |
| D259,569 S | 6/1981 | Nishioka | |
| D262,632 S | 1/1982 | Yamazaki | |
| D265,479 S | 7/1982 | Yamazaki | |
| 5,581,399 A | 12/1996 | Abe | 359/410 |
| 5,583,692 A | 12/1996 | Funatsu | 359/422 |
| 5,963,369 A | 10/1999 | Steinthal et al. | 359/410 |
| 6,014,253 A | 1/2000 | Funatsu | 359/418 |
| 6,088,053 A | 7/2000 | Hammack et al. | 348/61 |
| 6,324,023 B1 * | 11/2001 | Nagaoka et al. | 359/824 |
| 2001/0028498 A1 | 10/2001 | Haga et al. | 359/407 |
| 2003/0063189 A1 * | 4/2003 | Hirunuma et al. | 348/79 |
| 2003/0063209 A1 * | 4/2003 | Enomoto et al. | 348/335 |
| 2003/0063380 A1 * | 4/2003 | Hirunuma et al. | 359/407 |
| 2003/0063382 A1 * | 4/2003 | Hirunuma et al. | 359/429 |
| 2003/0081324 A1 * | 5/2003 | Takeshita | 359/694 |
| 2003/0151660 A1 * | 8/2003 | Hirunuma et al. | 348/42 |
| 2003/0151807 A1 * | 8/2003 | Hirunuma et al. | 359/409 |
| 2003/0151808 A1 * | 8/2003 | Hirunuma et al. | 359/409 |

FOREIGN PATENT DOCUMENTS

| | | |
|---|---|---|
| GB | 2380266 | 4/2003 |
| GB | 2381151 | 4/2003 |
| GB | 2381152 | 4/2003 |
| JP | 6-2330 | 1/1994 |
| JP | 11-64743 | 3/1999 |
| JP | 2000-28897 | 1/2000 |
| JP | 2001-281555 | 10/2001 |
| WO | 01/52531 | 7/2001 |

OTHER PUBLICATIONS

English Language Abstract of JP 2000–28897.
A website printout entitled "The Pentax Digibino DB100—A New Horizon in Digital Imaging", dated Feb. 23, 2002.
English Language Abstract of JP 11–64743.

\* cited by examiner

Primary Examiner—Georgia Epps
Assistant Examiner—M. Hasan
(74) Attorney, Agent, or Firm—Greenblum & Bernstein, P.L.C.

(57) ABSTRACT

An optical device comprises a lens barrel and a casing. The casing has two casing sections that are movable relative to each other. A distribution cable is provided in the casing, and extends between the casing sections. The distribution cable is loosely wound around the lens barrel, whereby a movement of the distribution cable, caused by a relative movement of the casing sections, is absorbed by the loosely wound portion of the distribution cable.

10 Claims, 8 Drawing Sheets

OPTICAL DEVICE

BACKGROUND OF THE INVENTION

1. Field of the Invention

The present invention relates to an optical device having a lens barrel for holding an optical system, and a casing for housing the lens barrel. The casing has two casing sections that are movable relative to each other, and a distribution cable is provided between the casing sections.

2. Description of the Related Art

As an example of the optical device, there is a slide-type binocular telescope, which has a casing composed of two casing sections slidably engaged with each other so as to expand and contract in right and left directions, and in which an observation optical system is housed in each of the casing sections. The casing sections are moved relative to each other, so that the interpupillary distance can be adjusted, which is a necessary function for a binocular telescope. Although an electronic control device is not essential in the slide-type binocular telescope, if the binocular telescope is provided with an automatic focusing function or an electronic photographing function, an electronic control device should be provided.

As another example of the optical device, there is an electronic camera, i.e., digital camera using a solid-state imaging device. For a digital camera, it is important to be compact and portable, and therefore, a part of the casing may be able to expand and contract relative to the main part of the casing. Namely, when carrying the digital camera, a part of the casing is housed in the main part of the casing so as to reduce the overall dimensions of the body, and when performing a photographing operation, the part of the casing housed in the main part is pulled. Of course, an electronic control device is essential for a digital camera.

In the optical devices described above, a battery and a power supply circuit board are essential in order to supply electric power to the electronic control devices. Namely, a power supply circuit provided on the power supply circuit board receives a power supply, and supplies electric power having a predetermined voltage to electronic parts contained in the electronic control device.

When the battery and the power supply circuit board are disposed at separate positions, or at opposite sides of the binocular telescope or the digital camera, it is necessary to connect the battery and the power supply circuit board with a power supply cable, which extends between the two casing sections that are movable relative to each other. Thus, to ensure the relative movement of the casing sections, the power supply cable should be long enough. Namely, the power supply cable should be provided with enough looseness or slackness, and be deformed smoothly in accordance with the relative movement of the casing sections. In this case, the movement of the power supply cable should be restrained so as not to interfere with the internal mechanism provided in the binocular telescope or digital camera. However, provision of a restraining mechanism for properly restraining the movement of the power supply cable will increase the cost and size of the binocular telescope or digital camera, and therefore, is not preferable.

In the optical device described above, the relationship between the battery and the power supply circuit board was explained. On the other hand, in another type of optical device in which two casing sections are provided with control circuit boards, a signal cable should be provided between the control circuit boards, and hence, there occurs the same problem as described above.

SUMMARY OF THE INVENTION

Therefore, an object of the present invention is to provide an optical device in which a movement of a distribution cable is properly controlled, when two casing sections are moved relative to each other, and to achieve this without incurring an additional manufacturing cost.

According to the present invention, there is provided an optical device comprising a lens barrel, a casing, and a distribution cable. The lens barrel holds an optical system. The lens barrel is housed in the casing. The casing has two casing sections that are movable relative to each other. The distribution cable extends between the casing sections. The distribution cable is loosely wound around the lens barrel, whereby a movement of the distribution cable, caused by a relative movement of the casing sections, is absorbed by the loosely wound portion of the distribution cable.

A pair of the lens barrels may be housed in the casing sections, and in this case, the distribution cable is wound around one of the pair of lens barrels. Further, in this case, a pair of observation optical systems, functioning as a binocular telescope, may be provided, and at least a part of the observation optical systems may be held by the pair of lens barrels. The two casing sections may also be moved relative to each other to adjust the interpupillary distance of the pair of observation optical systems. Furthermore, in this case, the two casing sections may be linearly movable relative to each other in such a manner that the optical axes of the pair of observation optical systems are moved in a predetermined plane, so that the interpupillary distance of the pair of observation optical systems can be adjusted.

Each of the pair of observation optical systems may comprise an objective optical system, an erecting optical system, and an ocular optical system, only the objective optical system being housed in the lens barrel, the erecting optical system and the ocular optical system being movable back and forth relative to the objective optical system to perform a focusing movement. Preferably, one of the casing sections is provided with a focusing mechanism and a rotary wheel for operating the focusing mechanism to perform the focusing movement, and the distribution cable is wound around the lens barrel housed in another of the casing sections. Preferably, the rotary wheel is an annular projection formed on an outer surface of a rotary wheel cylinder in which a photographing optical system is mounted. Optionally, a battery is housed in an outer side of one of the casing sections, and a power supply circuit board is housed in an outer side of another of the casing sections, the distribution cable being a power supply cable connecting the battery and the power supply circuit board.

Preferably, the distribution cable has a loop portion that is loosely wound around the lens barrel, the movement of the distribution cable being absorbed by a change in the diameter of the loop portion. The loop portion may keep the loop shape without contacting an inner wall of the casing when the casing sections are relatively positioned such that the diameter of the loop portion reaches its maximum.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
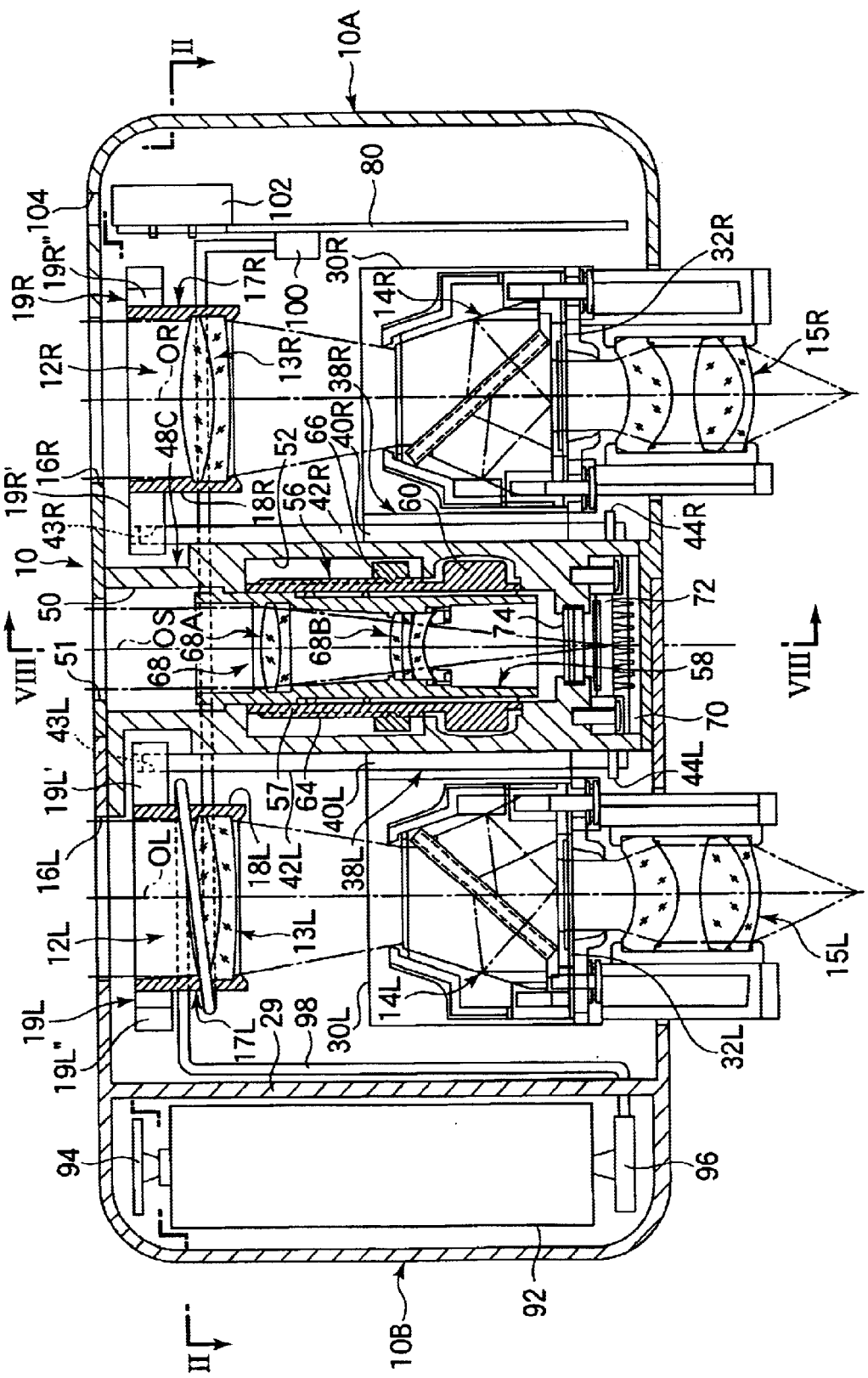
FIG. 1 is a horizontal sectional view showing an embodiment of a binocular telescope with a photographing function according to the present invention, in a state in which a movable casing section is set at a retracted position.

The present invention will be described below with reference to the embodiments shown in the drawings.

Figure 2:
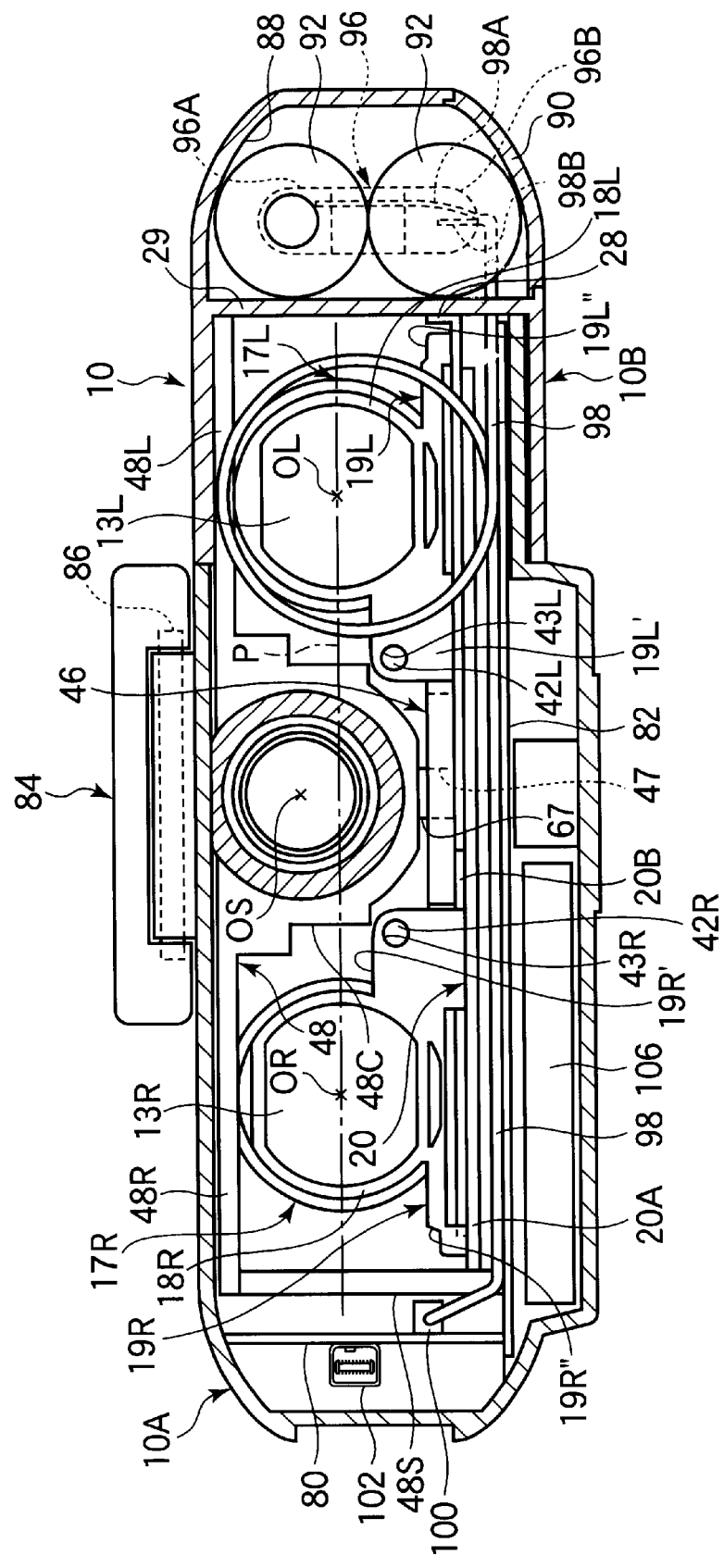
FIG. 2 is a sectional view along II—II line of FIG. 1.

FIG. 1 shows an internal structure of an optical device to which an embodiment of the present invention is applied, the optical device being a binocular telescope with a photographing function. FIG. 2 is a sectional view along line II—II of FIG. 1. The binocular telescope has a casing 10 having a box-like shape, and comprising a main casing section 10A and a movable casing section 10B.

A pair of telescopic optical systems (i.e., observation optical systems) 12R and 12L are provided in the casing 10. The telescopic optical systems 12R and 12L have a symmetrical structure, and are used for a right telescopic optical system and a left telescopic optical system. The right telescopic optical system 12R is mounted in the main casing section 10A, and contains an objective lens system 13R, an erecting prism system 14R, and an ocular lens system 15R. An observation window 16R is formed in a front wall of the main casing section 10A, and is aligned with the objective lens system 13R. The left telescopic optical system 12L is mounted in the movable casing section 10B, and contains an objective lens system 13L, an erecting prism system 14L, and an ocular lens system 15L. An observation window 16L is formed in a front wall of the movable casing section 10B and is aligned with the objective lens system 13L.

Note that for simplicity of explanation, in the following description, front and back are respectively defined as a side of the objective lens system and a side of the ocular lens system, relative to the pair of telescopic optical systems 12R and 12L, and right and left are respectively defined as the right side and the left side when facing the ocular lens systems 15R and 15L.

The movable casing section 10B is slidably engaged with the main casing section 10A such that the movable casing section 10B can be moved relative to the main casing section 10A. Namely, the movable casing section 10B is movable between a retracted position shown in FIGS. 1 and 2, and a maximum-extended position in which the movable casing section 10B is pulled out from the retracted position shown in FIG. 3 and 4. A suitable friction force acts on the sliding surfaces of both the casing sections 10A and 10B and thus a certain extension or contraction force must be exerted on the movable casing section 10B before the movable casing section 10B can be extended from or contracted onto the main casing section 10A. Thus, it is possible for the movable casing section 10B to hold or stay still at an optical position between the fully retracted position (FIGS. 1 and 2) and the maximum-extended position (FIGS. 3 and 4), due to the suitable friction force acting on the sliding surface of both the casing sections 10A and 10B.

Figure 3:
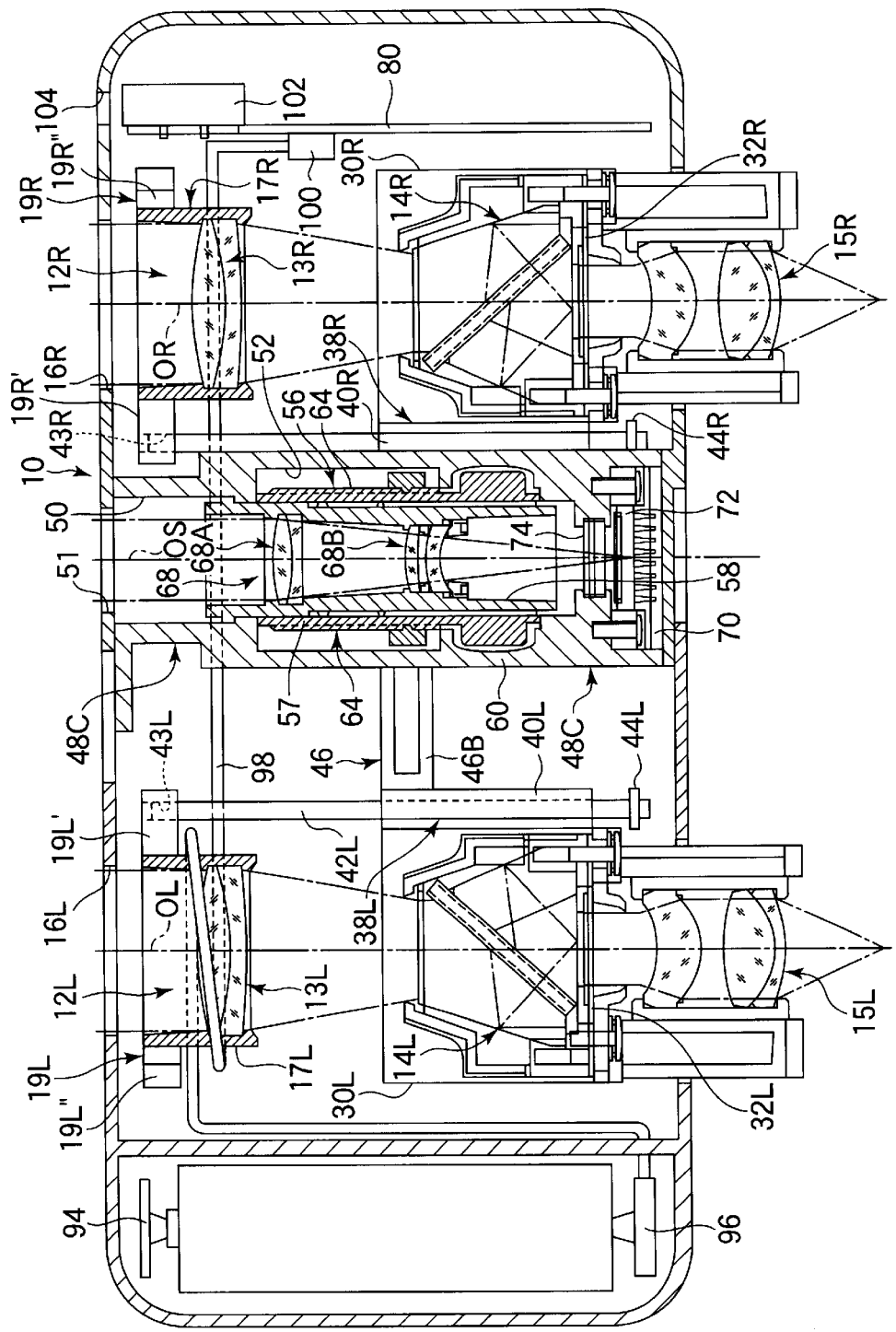
FIG. 3 is a horizontal sectional view similar to FIG. 1, the movable casing section being set at a maximum-extended position.
Figure 4:
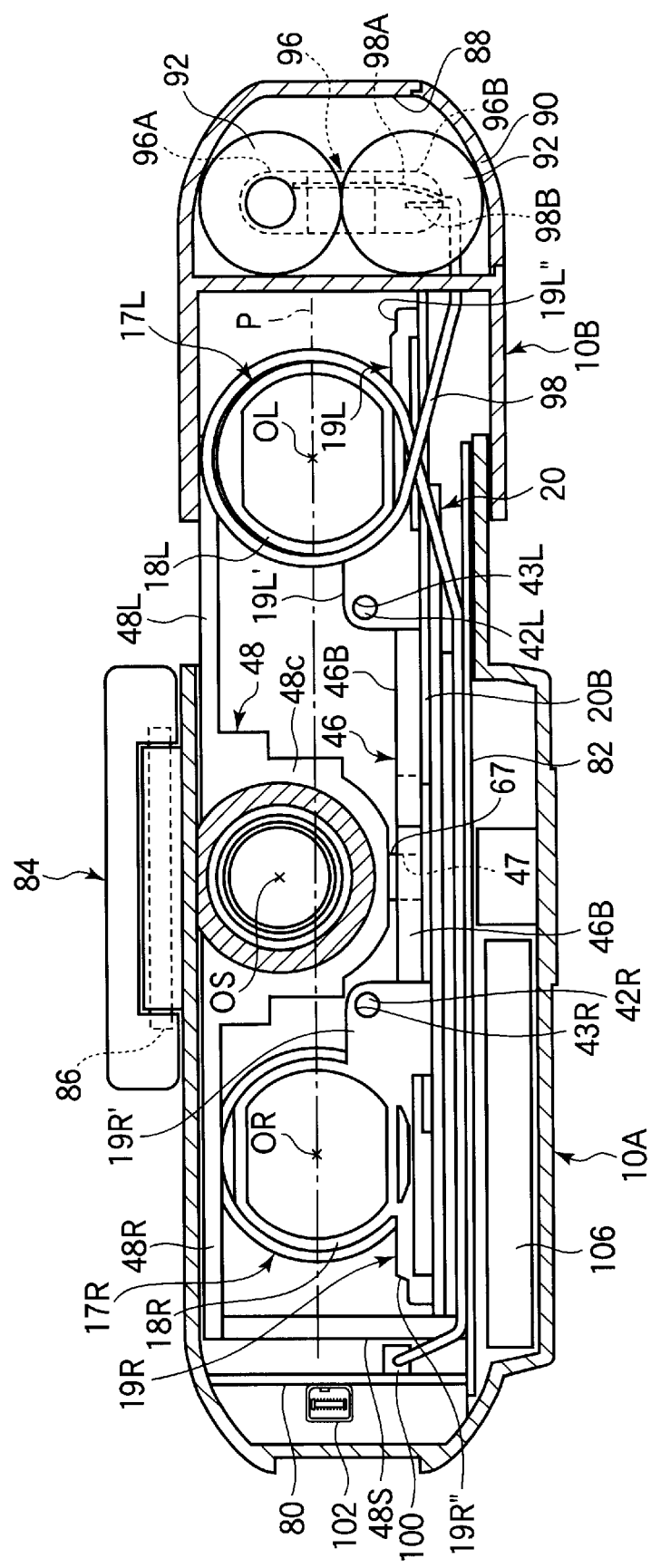
FIG. 4 is a horizontal sectional view similar to FIG. 2, the movable casing section being set at a maximum-extended position.

As understood from the comparison between FIGS. 1 and 2 and FIGS. 3 and 4, when the movable casing section 10B is pulled out from the main casing section 10A, the left telescopic optical system 12L is moved together with the movable casing section 10B while the right telescopic optical system 12R is held in the main casing section 10A. Thus, by positioning the movable casing section 10B at an arbitrary extended position relative to the main casing section 10A, the distance between the optical axes of the ocular lens systems 15R and 15L, i.e., the interpupillary distance is adjusted. When the movable casing section 10B is set at the retracted position relative to the main casing section 10A, the distance between the telescopic optical systems 12R and 12L becomes the minimum (FIGS. 1 and 2), and when the movable casing section 10B is set at the maximum-extended position relative to the main casing section 10A, the distance between the telescopic optical systems 12R and 12L becomes the maximum (FIGS. 3 and 4).

The objective lens system 13R of the right telescopic optical system 12R is housed in a lens barrel 17R, which is mounted at a fixed position relative to the main casing section 10A, and the erecting prism system 14R and the ocular lens system 15R can be moved back and forth with respect to the objective lens system 13R, so that the right telescopic optical system 12R can be focused. Similarly, the objective lens system 13L of the left telescopic optical system 12L is housed in a lens barrel 17L, which is mounted at a fixed position relative to the movable casing section 10B and the erecting prism system 14L and the ocular lens system 15L can be moved back and forth with respect to the objective lens system 13L, so that the left telescopic optical system 12L can be focused.

The lens barrel 17R has a cylindrical portion 18R, in which the objective lens system 13R is housed, and an attaching base 19R integrally formed under the cylindrical portion 18R. The attaching base 19R has an inside attaching portion 19R' extending toward the center of the casing 10 from the cylindrical portion 18R, and an outside attaching portion 19R" extending toward the outside of the casing 10 from the cylindrical portion 18R. The inside attaching portion 19R' is a side block portion having a relatively large thickness as shown in FIGS. 2 and 4, and the outside attaching portion 19R" is a flat portion.

Similarly, the lens barrel 17L has a cylindrical portion 18L, in which the objective lens system 13L is housed, and an attaching base 19L integrally formed under the cylindrical portion 18L. The attaching base 19L has an inside attaching portion 19L' extending toward the center of the casing 10 from the cylindrical portion 18L, and an outside attaching portion 19L" extending toward the outside of the casing 10 from the cylindrical portion 18L. The inside attaching portion 19L' is a side block portion having a relatively large thickness, and the outside attaching portion 19L" is a flat portion.

To perform the adjusting operation of interpupillary distance and the focusing operation described above, a support-plate assembly 20 shown in FIG. 5 is provided on a bottom side of the casing 10. Note that, in FIGS. 1 and 3, the support-plate assembly 20 is omitted for the simplicity of the drawings.

The support-plate assembly 20 is composed of a rectangular plate 20A, fixed to the main casing section 10A, and a slide plate 20B slidably disposed on the rectangular plate 20A and fixed to the movable casing section 10B. The slide plate 20B has a rectangular portion 22, having approximately the same breadth as the rectangular plate 20A, and an extending portion 24, integrally connected to and extending rightward from the rectangular portion 22. The attaching base 19R of the lens barrel 17R is fixed at a predetermined position on the rectangular plate 20A, and the attaching base 19L of the lens barrel 17L is fixed at a predetermined position on the rectangular portion 22 of the rectangular plate 20B. Note that, in FIG. 5, the fixed position of the attaching base 19R of the lens barrel 17R is indicated as an area enclosed by chain double-dashed line 25R, and the fixed position of the attaching base 19L of the lens barrel 17L is indicated as an area enclosed by chain double-dashed line 25L.

A pair of guide slots 26 are formed in the rectangular portion 22 of the slide plate 20B, and another guide slot 27 is formed in the extending portion 24. A pair of guide pins 26', slidably engaged with the guide slots 26, and guide pin 27', slidably engaged with the guide slot 27, are fixed on the rectangular plate 20A. The guide slots 26 and 27 are parallel to each other, and extend in the right and left direction by the same length. The length of each of the guide slots 26 and 27 corresponds to a movable distance of the movable casing section 10B relative to the main casing section 10A, i.e., the distance between the retracted position of the movable casing section 10B (FIGS. 1 and 2) and the maximum-extended position of the movable casing section 10B (FIGS. 3 and 4).

As understood from FIGS. 2 and 4, the support-plate assembly 20 is placed in the casing 10, and separated from the bottom of the casing 10 to form a space therein. The rectangular plate 20A is fixed to the main casing section 10A, and the slide plate 20B is fixed to the movable casing section 10B. Note that, for fixing the slide plate 20B to the movable casing section 10B a flange 28, extending along the left side edge of the rectangular portion 22, is provided, and fixed on a partition 29 formed in the movable casing section 10B.

Figure 6:
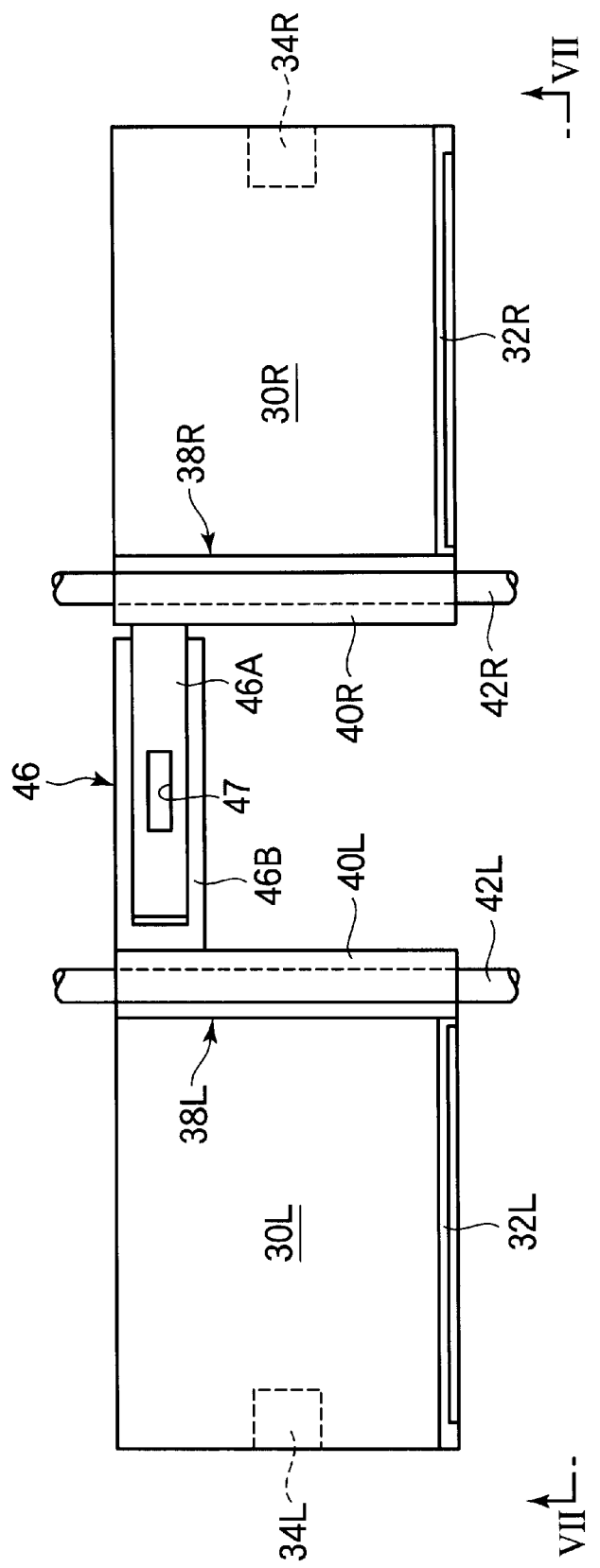
FIG. 6 is a plan view showing right and left mount plates which are disposed on the support-plate assembly.
Figure 7:
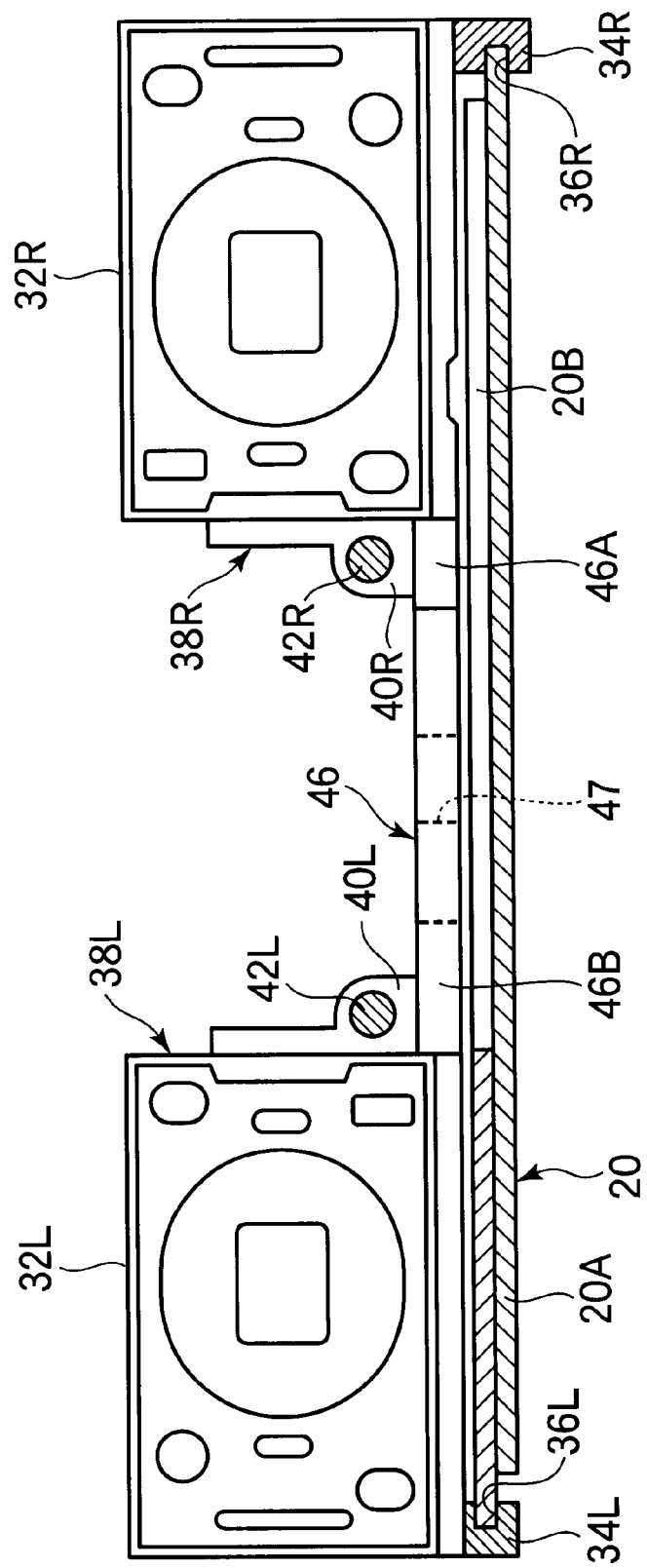
FIG. 7 is an elevational view observed along line VII—VII of FIG. 6.

FIGS. 6 and 7 show a right mount plate 30R and a left mount plate 30L. The right mount plate 30R is provided for mounting the erecting prism system 14R of the right telescopic optical system 12R, and the left mount plate 30L is provided for mounting the erecting prism system 14L of the left telescopic optical system 12L. Upright plates 32R and 32L are provided along rear peripheries of the right and left mount plates 30R and 30L. As shown in FIGS. 1 and 3, the right ocular lens system 15R is attached to the upright plate 32R, and the left ocular lens system 15L is attached to the upright plate 32L.

As shown in FIGS. 6 and 7, the right mount plate 30R is provided with a guide shoe 34R secured to the underside thereof in the vicinity of the right side edge thereof. The guide shoe 34R is formed with a groove 36R, which slidably receives a right side edge of the rectangular plate 20A, as shown in FIG. 7. Similarly, the left mount plate 30L is provided with a guide shoe 34L secured to the underside thereof in the vicinity of the left side edge thereof. The guide shoe 34L is formed with a groove 36L, which slidably receives a right side edge of the rectangular plate 20B, as shown in FIG. 7.

Note that since FIG. 7 is a sectional view along line VII—VII of FIG. 6, the support-plate assembly 20 should not be indicated in FIG. 7. Nevertheless, for the simplicity of the explanation, in FIG. 7, the support-plate assembly 20 is indicated as a section along line VII—VII of FIG. 5, and the guide shoes 34R and 34L are indicated as sectional views.

As shown in FIGS. 6 and 7, the right mount plate 30R has a side wall 38R provided along a left side edge thereof, and a lower portion of the side wall 38R is formed as a swollen portion 40R having a through bore for slidably receiving a guide rod 42R. The front end of the guide rod 42R is inserted in a hole 43R formed in the inside attaching portion 19R' of the attaching base 19R, and is fixed thereto. The rear end of the guide rod 42R is inserted in a hole 45R formed in an upright fragment 44R integrally formed on a rear edge of the rectangular plate 20A, and is fixed thereto (see FIG. 5). Note that, in FIG. 5, the upright fragment 44R is indicated as a sectional view so that the hole 45R is observed, and in FIGS. 1 and 3, the rear end of the guide rod 42R is inserted in the hole 45R of the upright fragment 44R.

Similarly, the left mount plate 30L has a side wall 38L provided along a right side edge thereof, and a lower portion of the side wall 38L is formed as a swollen portion 40L having a through bore for slidably receiving a guide rod 42L. The front end of the guide rod 42L is inserted in a hole 43L formed in the inside attaching portion 19L' of the attaching base 19L, and is fixed thereto. The rear end of the guide rod 42L is inserted in a hole 45L formed in an upright fragment 44L integrally formed on a rear edge of the rectangular plate 20B, and is fixed thereto. Note that, similarly to the upright fragment 44R, in FIG. 5, the upright fragment 44L is indicated as a sectional view so that the hole 45L is observed, and in FIGS. 1 and 3, the rear end of the guide rod 42L is inserted in the hole 45L of the upright fragment 44L.

The objective lens system 13R of the right telescopic optical system 12R is disposed at a stationary position in front of the right mount plate 30R. Therefore, when the right mount plate 30R is moved back and forth along the guide rod 42R, the distance between the objective lens system 13R and the erecting prism system 14R is adjusted, so that a focusing operation of the right telescopic optical system 12R is performed. Similarly, since the objective lens system 13L of the left telescopic optical system 12L is disposed at a stationary position in front of the left mount plate 30L, by moving the left mount plate 30L back and forth along the guide rod 42L, the distance between the objective lens system 13L and the erecting prism system 14L is adjusted, so that a focusing operation of the left telescopic optical system 12L is performed.

Figure 5:
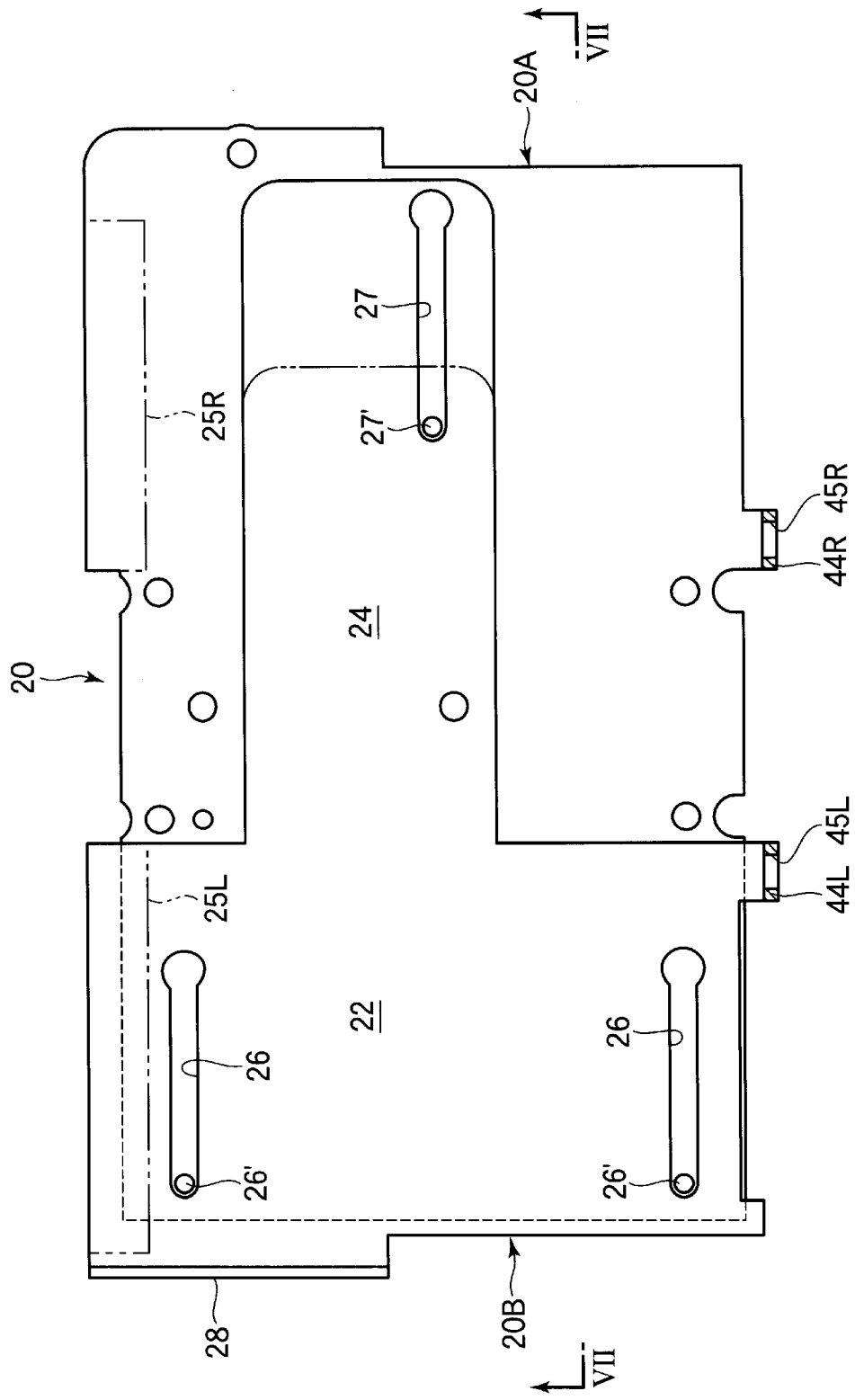
FIG. 5 is a plan view showing a support-plate assembly provided in a casing of the binocular telescope.

In order to simultaneously move the right and left mount plates 30R and 30L along the guide rods 42r and 42L such that a distance between the right and left mount plates 30R and 30L is variable, the mount plates 30R and 30L are interconnected to each other by an expandable coupler 46, as shown in FIGS. 5 and 6.

In particular, the expandable coupler 46 includes a rectangular lumber-like member 46A, and a forked member 46B in which the lumber-like member 46A is slidably received. The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both members 46A and 46B have a length which is greater than the distance of movement of the movable casing section 10B between its retracted position (FIGS. 1 and 2) and its maximum extended position (FIGS. 3 and 4). Namely, even though the movable casing section 10B is extended from the retracted position to the maximum extended position, slidable engagement is maintained between the members 46A and 46B.

Figure 8:
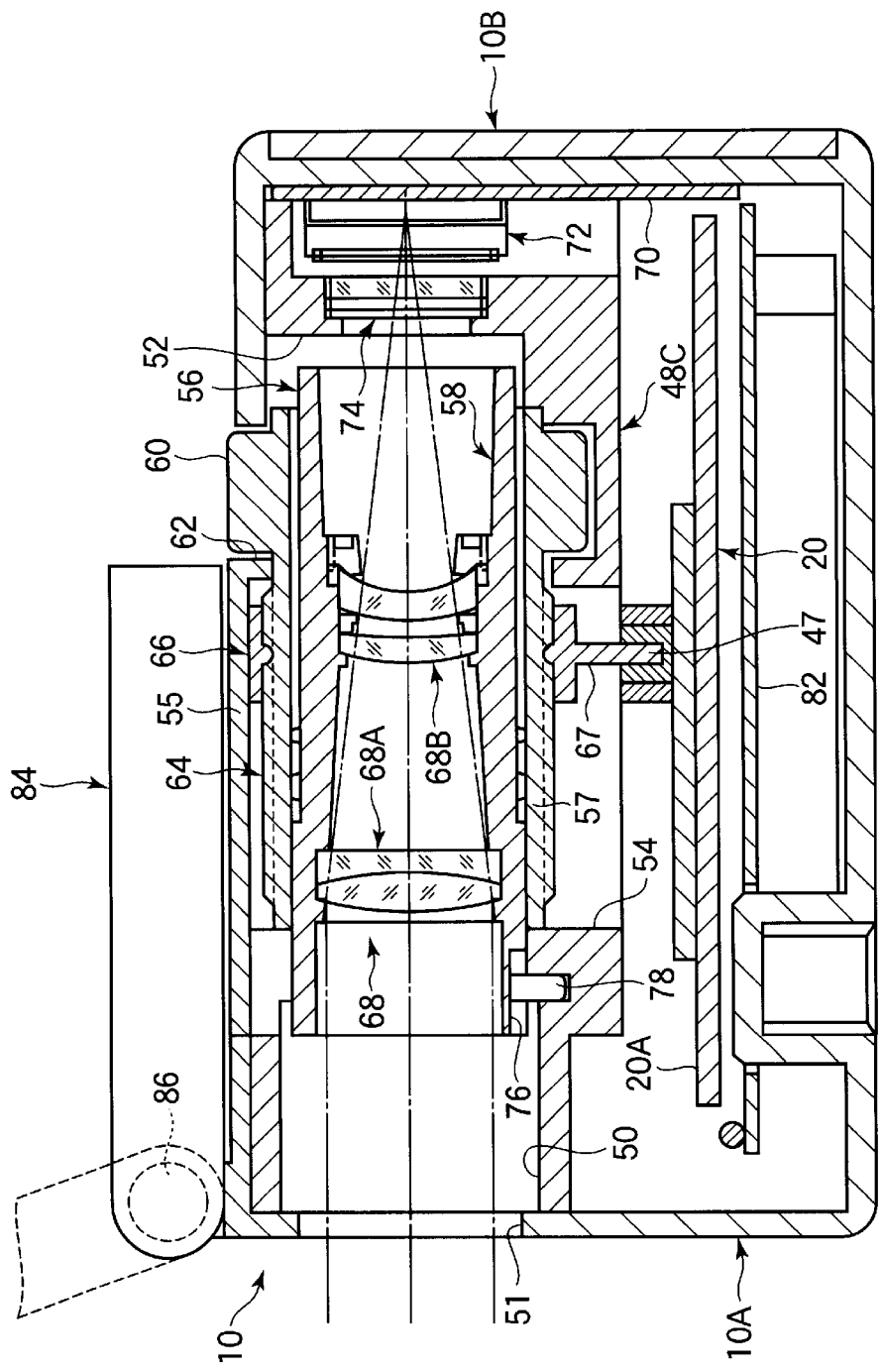
FIG. 8 is an elevational view observed along line VIII—VIII of FIG. 1.

With reference to FIG. 8, there is shown a vertical sectional view along line VIII—VIII of FIG. 1. As understood from FIGS. 2, 4, and 8, an inner frame 48 is housed in the casing 10, and is fixed to the main casing section 10A and the rectangular plate 20A. The inner frame 48 has a central portion 48C, a right wing portion 48R extending from the central portion 48C rightward, a vertical wall 48S extending from a right periphery of the right wing portion 48R downward, and a left wing portion 48L extending from the central portion 48C leftward.

As shown in FIG. 8, a bore 50 is formed in a front end portion of the central portion 48C, and is aligned with a circular window 51 formed in a front wall of the main casing section 10A. A recess 52 is formed in a rear portion in the central portion 48C, and a rectangular opening 54 is formed in a bottom of the recess 52. A top wall of the main casing section 10A is provided with an opening for exposing the recess 52, and the opening is closed by a cover plate 55 which can be removed from the opening.

A tubular assembly 56 is assembled in the recess 52 while the cover plate 55 is removed. The tubular assembly 56 has a rotary wheel cylinder 57 and a lens barrel 58 disposed coaxially in the rotary wheel cylinder 57. The rotary wheel cylinder 57 is rotatably supported in the recess 52, and the lens barrel 58 can be moved along the central axis thereof while the lens barrel 58 is kept still so as not to rotate about the central axis. After assembling the tubular assembly 56, the cover plate 55 is fixed to cover the recess 52. A rotary wheel 60 is provided on the rotary wheel cylinder 57. The rotary wheel 60 has an annular projection formed on an outer surface of the rotary wheel cylinder 57, and the rotary wheel 60 exposes outside the top wall of the main casing section 10A through an opening 62 formed in the cover plate 55. (62 was added on March 11).

Helicoids 64 are formed on an outer surface of the rotary wheel cylinder 57, and an annular member 66 is threadingly fit on the helicoids 64. Namely, aplurality of projections, engaged with the helicoids 64 of the rotary wheel cylinder 57, are formed on an inner wall of the annular member 66, and disposed at a constant interval. A flat surface is formed on an outer periphery of the annular member 66, and is slidably engaged with an inner wall of the cover plate 55. Namely, when the rotary wheel cylinder 57 is rotated, the annular member 66 is not rotated due to the engagement of the flat surface and the inner wall of the cover plate 55, and is kept in a non-rotational state. Thus, when the rotary wheel cylinder 57 is rotated, the annular member 66 is moved along the central axis of the rotary wheel cylinder 57 due to the threading contact with the helicoids 64, and the moving direction depends on the rotational direction of the rotary wheel cylinder 57.

A tongue 67 is projected from the annular member 66, and is positioned at an opposite side of the flat surface of the annular member 66. As shown in FIG. 8, the tongue 67 is projected from the rectangular opening 54 of the central portion 48C, and is inserted in a hole 47 formed in the rod member 46A. Therefore, when a user rotates the rotary wheel cylinder 57 by contacting the exposed portion of the rotary wheel 60 with a finger, for example, the annular member 66 is moved along the central axis of the rotary wheel cylinder 57, as described above, so that the mount plates 30R and 30L are moved along the optical axes of the telescopic optical systems 12R and 12L. Thus, the rotational movement of the rotary wheel 60 is transformed into linear movements of the erecting prism systems 14R and 14L, and the ocular lens systems 15R and 15L, so that the telescopic optical systems 12R and 12L can be focused.

In this embodiment, the pair of telescopic optical systems 12R and 12L are designed, for example, in such a manner that, when the distance from each of the erecting prism systems 14R and 14L, and the ocular lens systems 15R and 15L to each of the objective lens systems 13R and 13L is the shortest, the pair of telescopic optical systems 12R and 12L focus on an object located at a distance between 40 meters ahead of the binocular telescope and infinity, and when observing an object between 2 meters and 40 meters ahead of the binocular telescope, the erecting prism systems and the ocular lens systems are separated from the objective lens systems so as to focus on the object. Namely, when the erecting prism systems are separated from the objective lens systems by the maximum distance, the pair of telescopic optical systems focus on an object located at a distance approximately 2 meters ahead of the binocular telescope.

A photographing optical system 68 is provided in the lens barrel 58, which is coaxially disposed in the rotary wheel cylinder 57. The photographing optical system 68 has a first lens group 68A and a second lens group 68B. A circuit board 70 is attached on an inner surface of a rear end wall of the main casing section 10A. A solid-state imaging device such as a CCD 75 is mounted on the circuit board 70, and a light-receiving surface of the CCD 72 is aligned with the photographing optical system 68. An opening is formed in a rear end portion of the central portion 48C of the inner frame 48, and is aligned with the optical axis of the photographing optical system 68. An optical low-pass filter 74 is fit in the opening. Thus, the binocular telescope of this embodiment has the same photographing function as a digital camera, so that an object image obtained by the photographing optical system 68 is formed on the light-receiving surface of the CCD 72.

In FIGS. 1 through 4, the optical axis of the photographing optical system 68 is indicated by the reference OS, and the optical axes of the right and left telescopic optical systems 12R and 12L are indicated by references OR and OL. The optical axes OR and OL are parallel to each other, and to the optical axis OS of the photographing optical system 68. As shown in FIGS. 2 and 4, the optical axes OR and OL define a plane P which is parallel to the optical axis OS of the photographing optical system 68. The right and left telescopic optical systems 12R and 12L can be moved parallel to the plane P, so that the distance between the optical axes OR and OL, i.e., the interpupillary distance, can be adjusted.

When the photographing optical system 68 is constructed to be able to perform pan-focus photography in which the photographing optical system 68 focuses an object including a near object, which is situated at a predetermined distance ahead of the binocular telescope, and an object at infinity, and a photographing operation is performed only in the pan-focus photography, a focusing mechanism does not need to be mounted in the lens barrel 58. However, when the binocular telescope is required to photograph a near object, which is situated less than 2 meters ahead of the binocular telescope similarly to a usual camera, the lens barrel 58 needs to be provided with a focusing mechanism.

Therefore, a female screw is formed on an inner wall of the rotary wheel cylinder 57, and a male screw, engaged with the female screw of the rotary wheel cylinder 57, is formed on an outer wall of the lens barrel 58. The front end of the lens barrel 58 is inserted in the bore 50, and a bottom portion of the front end is formed with a key groove 76, which extends from the front end of the lens barrel 58 in the longitudinal direction by a predetermined length. A hole is formed in a bottom portion of the front end of the inner frame 48, and a pin 78 is planted in the hole to engage with the key groove 76. Thus, by the engagement of the key groove 76 and the pin 78, the rotation of the lens barrel 58 is prevented.

Therefore, when the rotary wheel cylinder 57 is rotated by an operation of the rotary wheel 60, the lens barrel 58 is moved along the optical axis of the photographing optical system 68. Thus, the female screw formed on the inner wall of the rotary wheel cylinder 57 and the male screw formed on the outer wall of the lens barrel 58 form a movement-conversion mechanism that converts a rotational movement of the rotary wheel 57 into a linear movement or focusing movement of the lens barrel 58.

Helicoids 64 formed on the outer wall of the rotary wheel cylinder 57 and the female screw formed on the inner wall of the rotary wheel cylinder 57 are inclined in the opposite direction to each other so that, when the rotary wheel cylinder 57 is rotated in such a manner that the erecting prism systems 14R and 14L and the ocular lens systems 15R and 15L are separated from the objective lens systems 13R and 13L, the lens barrel 58 is moved to separate from the CCD 72. Due to this, an image of a near object can be focused on the light-receiving surface of the CCD 72. The pitch of the helicoids 64 and the pitch of the female screw of the inner wall are different from each other in accordance with the optical characteristics of the pair of telescopic optical systems 12R and 12L and the photographing optical system 68.

As shown in FIGS. 1 through 4, a power supply circuit board 80 is provided in a right end portion of the main casing section 10A. Since components including a transformer are mounted on the power supply circuit board 80, the weight of the power supply circuit board 80 is relatively high. As shown in FIGS. 2, 4, and 8, a main control circuit board 82 is provided between the bottom of the main casing section 10A and the support-plate assembly 20, and is fixed on the bottom. Electronic parts such as a microcomputer and a memory are mounted on the main control circuit board 82, and the circuit board 70 and the power supply circuit board 80 are connected to the main control circuit board 82 through a flat flexible wiring cord (not shown).

In the embodiment, as shown in FIGS. 2, 4, and 8, an LCD monitor 84 is disposed on an upper surface of the top wall of the main casing section 10A. The LCD monitor 84 has a flat rectangular plate shape. The LCD monitor 84 is arranged in such a manner that its front and rear sides, positioned at opposite sides, are perpendicular to the optical axis of the photographing optical system 68, and the LCD monitor 84 is rotatable about a rotational shaft 86 provided along the front side. The LCD monitor 84 is usually folded or closed as shown by a solid line in FIG. 8. In this condition, since the display surface of the LCD monitor 84 faces an upper surface of the main casing section 10A, the display surface cannot be seen. Conversely, when a photographing operation is performed using the CCD 72, the LCD monitor 84 is rotated and raised from the folding position to a display position shown by a broken line in FIG. 8, so that the display surface of the LCD monitor 84 can be seen from the side of the ocular lens systems 15R and 15L.

The left end portion of the movable casing section 10B is divided by the partition 29, to form a battery chamber 88 in which batteries 92 are housed. As shown in FIGS. 2 and 4, a lid 90 is provided in a bottom wall of the battery chamber 88. By opening the lid 90, the batteries 92 can be mounted in or removed from the battery chamber 88. The lid 90 forms a part of the movable casing section 10B and is fixed at a closing position shown in FIGS. 2 and 4 through a proper engaging mechanism.

As described above, the weight of the power supply circuit board 80 is relatively high, and similarly, the weights of the batteries 92 are relatively high. In the embodiment, two components having a relatively large weight are disposed in the both ends of the casing 10. Therefore, the weight balance of the binocular telescope with a photographing function is improved.

As shown in FIGS. 1 and 3, electrode plates 94 and 96 are provided at front and rear portions of the battery chamber 88. The batteries 92 are arranged in parallel to each other in the battery chamber 88, and directed in the opposite directions in the battery chamber to contact the electrode plates 94 and 96. The electrode plate 94 is made of a conducting material to electrically connect a positive electrode of one of the batteries 92 and a negative electrode of the other of the batteries 92, so that the batteries 92 are connected to each other in series. Conversely, the electrode plate 96 is made of an insulating material, and is provided with two conductive portions 96A and 96B as shown in FIGS. 2 and 4. The conductive portion 96A is connected to the negative electrode of the upper battery 92, and the conductive portion 96B is connected to the positive electrode of the lower battery 92.

Electric power generated by the batteries 92 is supplied to the power supply circuit board 80 through a distribution cable (or power supply cable) 98 extending between the main casing section 10A and the movable casing section 10B. Namely, the distribution cable 98 extends in an interpupillary adjusting direction which is perpendicular to the optical axes OR and OL. As shown in FIGS. 2 and 4, the power supply cable 98 is formed by bundling two leads 98A and 98B, which are covered wires. The leads 98A and 98B are soldered on the conductive portions 96A and 98B.

As shown in FIGS. 1 and 3, the power supply cable 98 passes through the partition 29, and extends to the front side along the partition 29. The power supply cable 98 is directed to the right side, and loosely wound around the lens barrel 17L of the objective lens system 13L. The power supply cable 98 passes under the central portion 48C of the inner frame 48 and the lens barrel 17R of the objective lens system 13R, and is connected to a connector 100 provided on the power supply circuit board 80. When the power supply circuit board 80 receives an electric power from the batteries 92, an electric power having a predetermined voltage is supplied to each of the electronic parts such as the microcomputer and the memory mounted on the CCD 72, by the power supply circuit board 80.

When the movable casing section 10B is moved relative to the main casing section 10A in order to adjust the interpupillary distance, the power supply cable 98 should be long enough to ensure the relative movement. Therefore, the power supply cable 98 is loosely wound around the lens barrel 17L to form a loop.

As understood from a comparison between FIGS. 1 and 2 and FIGS. 3 and 4, when the movable casing section 10B is set at the retracted position relative to the main casing section 10A (FIGS. 1 and 2), the power supply cable 98 is wound around the lens barrel 17L with a sufficient looseness. The size of the loop portion of the power supply cable 98 around the lens barrel 17L is slightly smaller than the thickness of a space in the binocular telescope, i.e., the loop portion has almost the same size as the thickness of the space in the casing 10 without contacting the inner wall surface of the casing 10, so that the loop portion does not receive an external force from the inner wall surface while keeping approximately the circular shape.

Namely, the loop portion keeps the loop shape when the casing sections 10A and 10B are relatively positioned such that the diameter of the loop portion becomes the maximum. Thus, a part of the power supply cable 98 required for adjusting the interpupillary distance is accumulated or held around the lens barrel 17L in the loop shape without bending.

The loop portion of the power supply cable 98 is subjected to a restoring force that always expands the diameter of the loop. This force is due to an elastic force caused by a vinyl cover covering the cable 98. Due to this, the loop portion is always formed around the lens barrel 17L when the movable casing section 10B is moved between the retracted position and the maximum extended position, without providing a special mechanism for urging or guiding the loop portion. Namely, when the movable casing section 10B is moved from the main casing section 10A to the maximum extended position (FIGS. 3 and 4), the diameter of the loop portion is gradually decreased and squeezed around the lens barrel 17L while the loop portion keeps the loop shape. Conversely, when the movable casing section 10B is moved from the maximum extended position to the retracted position, the diameter of the loop portion is gradually increased while the loop portion keeps the loop shape.

Thus, the movement of the power supply cable 98 caused by the relative movement of the movable casing 10B relative to the main casing section 10A is absorbed by the loosely wound portion around the lens barrel 17L, i.e., the change in the diameter of the loop portion. Accordingly, the power supply cable 98 is prevented from largely deforming, and the movement of the power supply cable 98 is restricted such that the loop portion is held around the lens barrel 17L. Therefore, the power supply cable 98 cannot interfere with the electronic parts mounted on the main control circuit board 82 and the various mechanisms housed in the casing 10. Further, since the loop portion keeps approximately a circular shape, the loop portion can smoothly follow the movement of the movable casing section 10B.

As shown in FIG. 1 through FIG. 4, it is possible to provide a video output terminal 102, for example, as an external connector, on the power supply circuit board 80, and in this case, a hole 104 is formed in the front wall of the main casing section 10A so that an external connector is connected to the video output terminal 102. Further, as shown in FIGS. 2 and 3, a CF-cardholder 106, in which a CF-card can be detachably mounted as a memory card, may be provided below the main control circuit board 82 on the bottom of the main casing section 10A.

Although the power supply cable 98 is wound around the left lens barrel 17L in the embodiment, the power supply cable 98 can be wound around the right lens barrel 17R instead of the left lens barrel 17L. Further, the power supply cable 98 may be wound around both of the lens barrel 17R and 17L, and in this case, the amount of loose power supply cable 98 is distributed to both of the lens barrels 17R and 17L.

Furthermore, the present invention can be applied to optical device other than the binocular telescope with a photographing function, i.e., a digital camera in which a part of the casing is movable. In this case, a distribution cable such as a power supply cable or a signal cable, extending between the main casing section and the movable casing section, is wound around the lens barrel of the photographing optical system of the digital camera.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-100045 (filed on Apr. 2, 2002) which is expressly incorporated herein, by reference, in its entirety.

What is claimed is:

1. An optical device comprising:
a lens barrel that holds an optical system;
a casing in which said lens barrel is housed, said casing having two casing sections that are movable relative to each other; and
a distribution cable that extends between said casing sections, said distribution cable being loosely wound around said lens barrel, whereby a movement of said distribution cable, caused by a relative movement of said casing sections, is absorbed by the loosely wound portion of said distribution cable around said lens barrel.

2. An optical device according to claim 1, wherein a pair of said lens barrels is housed in said casing sections, and said distribution cable is wound around one of said pair of lens barrels.

3. An optical device according to claim 2, wherein a pair of observation optical systems, functioning as a binocular telescope, is provided, and at least a part of said observation optical systems is held by said pair of lens barrels, said two casing sections being relatively moved to adjust the interpupillary distance of the pair of observation optical systems.

4. An optical device according to claim 3, wherein said two casing sections are linearly relatively moved in such a manner that the optical axes of said pair of observation optical systems are moved in a predetermined plane, so that the interpupillary distance of the pair of observation optical systems is adjusted.

5. An optical device according to claim 3, wherein each of said pair of observation optical systems comprises an objective optical system, an erecting optical system, and an ocular optical system, only said objective optical system being housed in said lens barrel, said erecting optical system and said ocular optical system being movable back and forth relative to said objective optical system to perform a focusing movement.

6. An optical device according to claim 3, wherein one of said casing sections is provided with a focusing mechanism and a rotary wheel for operating said focusing mechanism to perform a focusing movement, and said distribution cable is wound around said lens barrel housed in another of said casing sections.

7. An optical device according to claim 6, wherein said rotary wheel is an annular projection formed on an outer surface of a rotary wheel cylinder in which a photographing optical system is mounted.

8. An optical device according to claim 1, wherein a battery is housed in an outer side of one of said casing sections, and a power supply circuit board is housed in an outer side of another of said casing sections, said distribution cable being a power supply cable connecting said battery and said power supply circuit board.

9. An optical device according to claim 1, wherein said distribution cable has a loop portion that is loosely wound around said lens barrel, said movement of said distribution cable being absorbed by a change in the diameter of said loop portion.

10. An optical device according to claim 9, wherein said loop portion keeps the loop shape without contacting an inner wall of the casing when said casing sections are relatively positioned such that the diameter of said loop portion becomes the maximum.

* * * * *